United States Patent
Haas et al.

(10) Patent No.: US 11,377,001 B2
(45) Date of Patent: Jul. 5, 2022

(54) REMOVABLE REAR VEHICLE SEAT

(71) Applicant: Mahindra N.A. Tech Center, Auburn Hills, MI (US)

(72) Inventors: Richard P. Haas, Ferndale, MI (US); Robert B. Mooney, Clarkston, MI (US); Anthony A. Pacella, Waterford, MI (US); Owen T. Smith, Flint, MI (US); Robert Fehan, Clarkston, MI (US); Anthony Laudicina, Garden City, MI (US); Kenneth R. Elliott, Richmond, MI (US)

(73) Assignee: Mahindra N.A. Tech Center, Auburn Hills, MI (US)

(*) Notice: Subject to any disclaimer, the term of this patent is extended or adjusted under 35 U.S.C. 154(b) by 150 days.

(21) Appl. No.: 17/000,463

(22) Filed: Aug. 24, 2020

(65) Prior Publication Data

US 2021/0078466 A1 Mar. 18, 2021

Related U.S. Application Data

(60) Provisional application No. 62/901,420, filed on Sep. 17, 2019.

(51) Int. Cl.
*B60N 2/30* (2006.01)
*B60N 2/01* (2006.01)
*B60R 21/13* (2006.01)
*B60N 2/38* (2006.01)
*B60N 2/64* (2006.01)

(52) U.S. Cl.
CPC ........... *B60N 2/3097* (2013.01); *B60N 2/012* (2013.01); *B60N 2/38* (2013.01); *B60R 21/13* (2013.01); *B60N 2/3002* (2013.01); *B60N 2/64* (2013.01); *B60R 2021/132* (2013.01)

(58) Field of Classification Search
CPC ........ B60N 2/38; B60N 2/3097; B60N 2/012; B60R 2021/132; B60R 21/13
USPC ....................................... 296/65.03
See application file for complete search history.

(56) References Cited

U.S. PATENT DOCUMENTS

| | | | |
|---|---|---|---|
| 3,622,177 A * | 11/1971 | Notestine | B60R 21/13 296/102 |
| 7,080,870 B1 * | 7/2006 | McCann | B60N 2/01516 296/64 |
| 8,387,734 B2 * | 3/2013 | Krosschell | B60N 2/38 296/64 |
| 9,145,092 B1 * | 9/2015 | Reynolds | B60N 2/01 |

(Continued)

*Primary Examiner* — Jason S Morrow
(74) *Attorney, Agent, or Firm* — Harness, Dickey & Pierce, P.L.C.

(57) ABSTRACT

A removable seat for a vehicle that includes a roll over protection system. The seat includes a seat bottom and a seat back assembly. The seat bottom adapted to be removably coupled to the vehicle. The seat back assembly is spaced apart from the seat bottom and adapted to be fixed by a bracket or removably coupled to first and second posts of the roll over protection system. The seat back assembly includes a seat back, a beam and saddles. The seat back is longitudinally oriented and parallel to a forward direction of vehicle travel. The beam includes a tube, a first bracket and a second bracket. The first bracket being fixed to a first end of the tube and the second bracket being fixed to a second end of the tube. The saddles fixing the tube to the seat back and includes a curved portion fixed to the tube.

17 Claims, 5 Drawing Sheets

(56) References Cited

U.S. PATENT DOCUMENTS

| | | | | |
|---|---|---|---|---|
| 9,150,182 B1* | 10/2015 | Schlangen | ......... | B62D 33/0625 |
| 9,463,745 B2* | 10/2016 | Reynolds | ............... | B62D 47/00 |
| 9,481,265 B2* | 11/2016 | Moore | .................... | B60N 2/58 |
| 9,592,782 B2* | 3/2017 | Raska | ................ | B62D 33/0273 |
| 10,081,275 B2* | 9/2018 | Kluka | ..................... | B60N 2/24 |
| 10,625,639 B2* | 4/2020 | Deschamps | .......... | B60N 2/3093 |
| 10,843,649 B2* | 11/2020 | Sheets | .................... | B60R 21/11 |
| 11,059,443 B2* | 7/2021 | Davis | ................... | B62D 27/06 |
| 2015/0375803 A1* | 12/2015 | Raska | ................. | B62D 23/005 |
| | | | | 280/639 |

* cited by examiner

REMOVABLE REAR VEHICLE SEAT

CROSS-REFERENCE TO RELATED APPLICATIONS

This application claims the benefit of U.S. Provisional Application No. 62/901,420, filed on Sep. 17, 2019. The entire disclosure of the above application is incorporated herein by reference.

FIELD

The present disclosure relates to a removable rear vehicle seat.

BACKGROUND

This section provides background information related to the present disclosure and is not necessarily prior art.

Vehicles such as off-road utility vehicles have a cargo area that allows for the storing and hauling of cargo therein. While many side-by-side utility vehicles only include front seats, some of these vehicles are equipped with a transversely oriented rear seat. The rear seat occupies valuable cargo area, thereby limiting the amount of cargo that can be stored and hauled therein. Since the rear seat is permanently installed in the vehicle, it is difficult to use the vehicle to haul cargo. The teachings of the present disclosure provide a removable vehicle seat for an off-road utility vehicle that is longitudinally oriented. The vehicle seat allows for seating occupants when installed in the vehicle and allows for ample cargo area when removed from the vehicle.

SUMMARY

This section provides a general summary of the disclosure, and is not a comprehensive disclosure of its full scope or all of its features.

In one form, the present disclosure provides a removable vehicle seat for a vehicle that includes a roll over protection system (ROPS) having first and second spaced apart posts. The seat includes a seat bottom, a seat back assembly and first and second clamps. The seat bottom is adapted to be removably coupled to the vehicle. The seat back assembly is spaced apart from the seat bottom. The seat back assembly is adapted to be removably coupled to the first and second posts of the roll over protection system. The seat back assembly includes a seatback, a longitudinally extending beam and saddles. The seat back is longitudinally oriented and extends parallel to a forward direction of vehicle travel such that an occupant of the removable seat sits transversely to the forward direction of vehicle travel. The longitudinally extending beam is adapted to interconnect the first and second posts. The beam includes a tube, a first bracket and a second bracket. The first bracket is fixed to a first end of the tube and the second bracket is fixed to a second opposite end of the tube. The saddles fix the tube to the seat back and include a curved portion in engagement with and fixed to the tube. The saddles further include a flange fastened to the seat back. The first clamp removably interconnects the first bracket to one of the first and second posts. The second clamp removably interconnects the second bracket to the other of the first and second posts.

In some configurations of the vehicle seat of the present disclosure, the seat back includes a cover, a plate and a foam pad attached to the plate. The plate and the foam pad are disposed within the cover.

In some configurations, the first clamp includes a first clamp body and a first lever coupled to the first clamp body. The first lever is operable between a first position in which the first clamp body is movable along the one of the first and second posts and a second position in which the first clamp body is prevented from moving along the one of the first and second posts.

In some configurations, the second clamp includes a second clamp body and a second lever coupled to the second clamp body. The second lever is operable between a first position in which the second clamp body is movable along the other of the first and second posts and a second position in which the second clamp body is prevented from moving along the other of the first and second posts.

In another form, the present disclosure provides a vehicle having a vehicle body, a roll over protection system and a removable vehicle seat. The vehicle body has a utility area. The roll over protection system has first and second spaced apart posts disposed in the utility area and coupled to the vehicle body. The seat includes a seat bottom, a seat back assembly and first and second clamps. The seat bottom is adapted to be removably coupled to the vehicle. The seat back assembly is spaced apart from the seat bottom. The seat back assembly is adapted to be removably coupled to the first and second posts of the roll over protection system. The seat back assembly includes a seatback, a longitudinally extending beam and saddles. The seat back is longitudinally oriented and extends parallel to a forward direction of vehicle travel such that an occupant of the removable seat sits transversely to the forward direction of vehicle travel. The longitudinally extending beam is adapted to interconnect the first and second posts. The beam includes a tube, a first bracket and a second bracket. The first bracket is fixed to a first end of the tube and the second bracket is fixed to a second opposite end of the tube. The saddles fix the tube to the seat back and include a curved portion in engagement with and fixed to the tube. The saddles further include a flange fastened to the seat back. The first clamp interconnects the first bracket to one of the first and second posts. The second clamp interconnects the second bracket to the other of the first and second posts.

In some configurations of the vehicle of the above paragraph, the seat back and the beam are positioned at least partially outboard of the first and second posts.

In some configurations of the vehicle seat of any one or more of the above paragraphs, the seat bottom is coupled to a wall defining a rear wheel well via hook and loop fabric fasteners.

In some configurations of the vehicle seat of any one or more of the above paragraphs, the seat back includes a cover, a plate and a foam pad attached to the plate. The plate and the foam pad are disposed within the cover.

In some configurations of the vehicle seat of any one or more of the above paragraphs, the first clamp includes a first clamp body and a first lever coupled to the first clamp body. The first lever is operable between a first position in which the first clamp body is movable along the one of the first and second posts and a second position in which the first clamp body is prevented from moving along the one of the first and second posts.

In some configurations of the vehicle seat of any one or more of the above paragraphs, the second clamp includes a second clamp body and a second lever coupled to the second clamp body. The second lever is operable between a first position in which the second clamp body is movable along the other of the first and second posts and a second position in which the second clamp body is prevented from moving along the other of the first and second posts.

In some configurations of the vehicle seat of any one or more of the above paragraphs, the vehicle further includes another removable vehicle seat positioned within the utility area. The other removable vehicle seat faces the removable vehicle seat and is symmetric to the removable vehicle seat about a center of the utility area.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
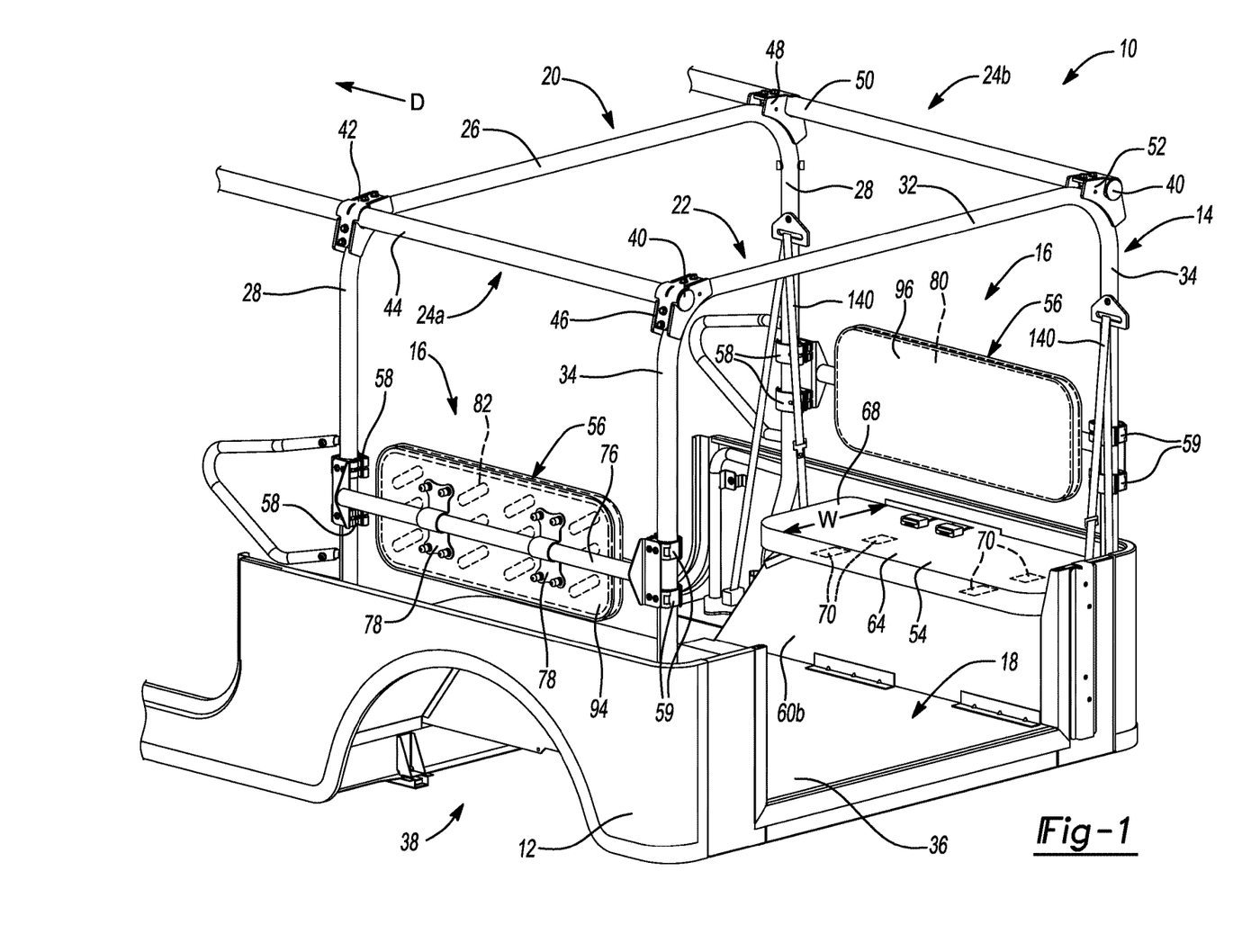
FIG. 1 is a partial perspective view of a vehicle having vehicle seats according to the principles of the present disclosure.

As shown in FIG. 1, a vehicle 10 such as a utility vehicle is provided. The vehicle 10 may include a vehicle body 12, a roll over protection system (ROPS) 14 and a plurality of vehicle seats 16. The vehicle body 12 may have one or more occupant areas (not shown) and a utility area 18. In some configurations, the utility area 18 may be used as an occupant area to seat occupants. In other configurations, the utility area 18 may be used as a cargo area to store cargo (i.e., luggage, bikes, etc.).

The roll over protection system 14 includes a first hoop member 20, a second hoop member 22 and longitudinal members 24a, 24b. The first hoop member 20 is coupled to the vehicle body 12 and is disposed within the utility area 18. The first hoop member 20 may be made of a metallic material (e.g., steel) and may be positioned near or at a front end of the utility area 18. The first hoop member 20 includes a cross-bar 26 that extends between two stanchions or posts 28. The second hoop member 22 is disposed within the utility area 18 and is spaced apart from the first hoop member 20 at or near an aft end of the utility area 18. The second hoop 22 may be made of a metallic material (e.g., steel) and includes a cross-bar 32 that extends between two stanchions or posts 34. Each post 34 is coupled to the vehicle body 12 (i.e., each post 34 may be coupled to a vehicle floor 36 or a top wall 60*a* of a respective rear wheel well 38 of the vehicle body 12).

Each longitudinal member 24*a*, 24*b* extends in a fore/aft direction D relative to the vehicle 10 and extends between a front end (not shown) and an aft end 40. Each longitudinal member 24*a*, 24*b* may be made of a metallic material (e.g., steel). Each longitudinal member 24*a*, 24*b* is spaced apart from each other and coupled to the first and second hoop members 20, 22 at respective sides of the vehicle 10. For example, the longitudinal member 24*a* may be positioned at a left side of the vehicle 10, and may be coupled to the first hoop member 20 (via a first connection device 42) at an intermediate portion 44 of the longitudinal member 24*a* and coupled to the second hoop member 22 (via a second connection device 46) at the aft end 40 of the longitudinal member 24*a*. Similarly, the longitudinal member 24*b* may be positioned at a right side of the vehicle 10, and may be coupled to the first hoop member 20 (via a third connection device 48) at an intermediate portion 50 of the longitudinal member 24*b* and coupled to the second hoop member 22 (via a fourth connection device 52) at the aft end 40 of the longitudinal member 24*b*.

With reference to FIGS. 2-5, each vehicle seat 16 includes a seat bottom 54 (FIGS. 1 and 2), a seat back assembly 56 and a plurality of clamps 58, 59. The seat bottom 54 is configured to be removably coupled to the top wall 60*a* (FIG. 4) of the respective rear wheel well 38 so as to overhang an inboard vertical wall 60*b* of the respective rear wheel well 38 (i.e., the seat bottom 54 extends past the wall 60*b* of the respective wheel well 38 that extends perpendicular to the top wall 60*a*). The seat bottom 54 is parallel to the fore/aft direction D of the vehicle 10.

Figure 2:
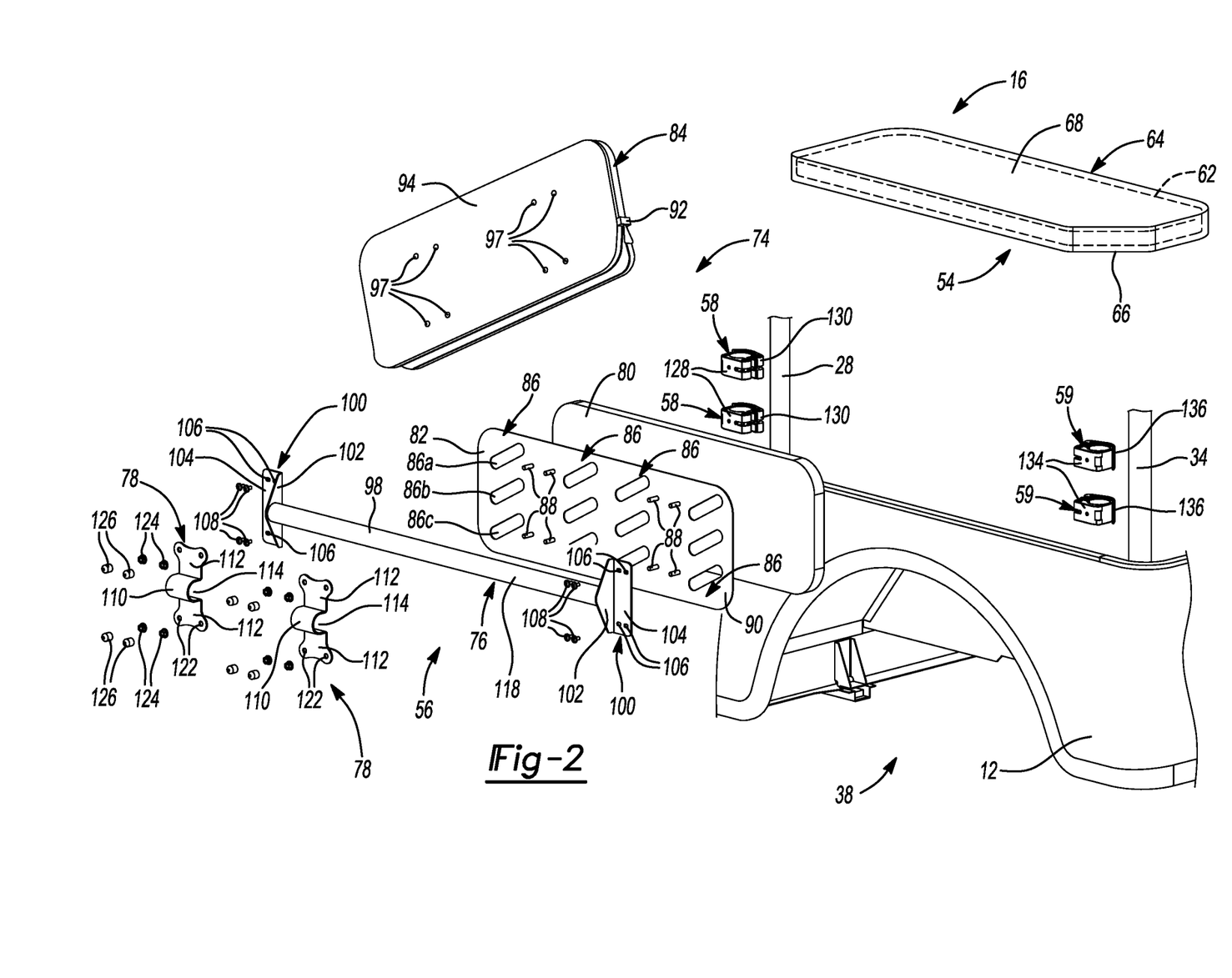
FIG. 2 is an exploded perspective view of one of the vehicle seats of FIG. 1.
Figure 3:
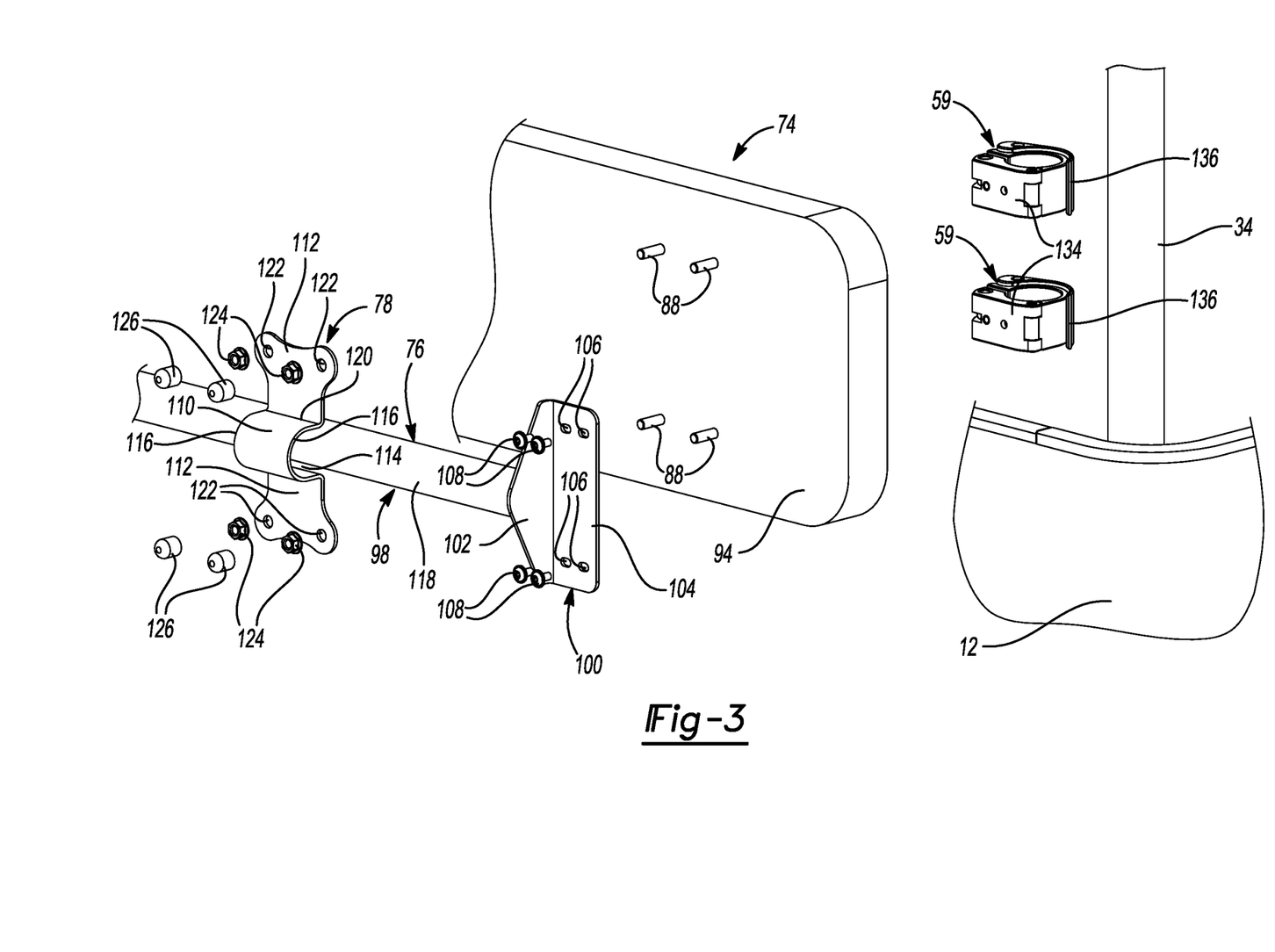
FIG. 3 is a partial exploded perspective view of a seat back assembly of one of the vehicle seats of FIG. 1.
Figure 4:
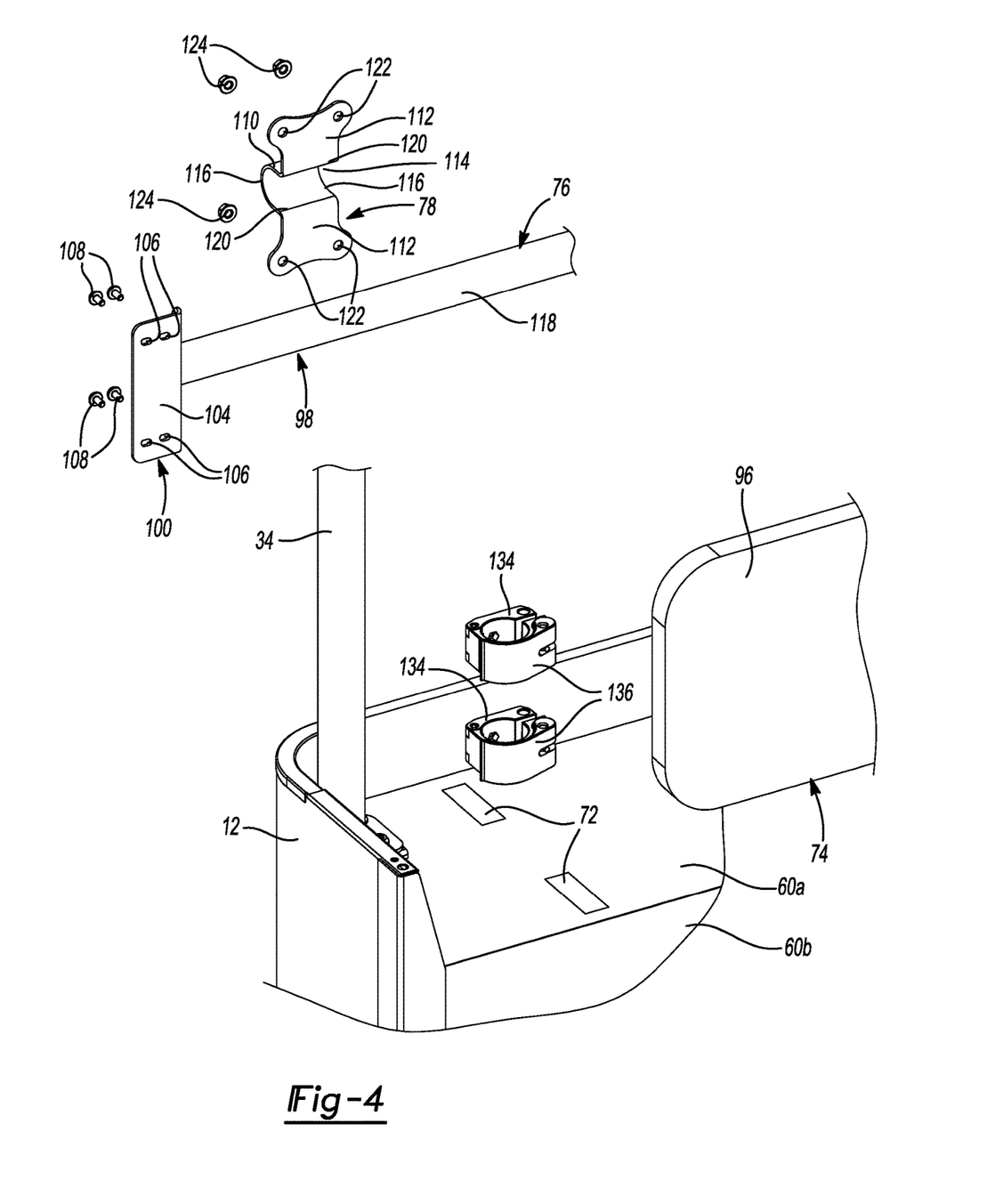
FIG. 4 is another partial exploded perspective view of the seat back assembly.
Figure 5:
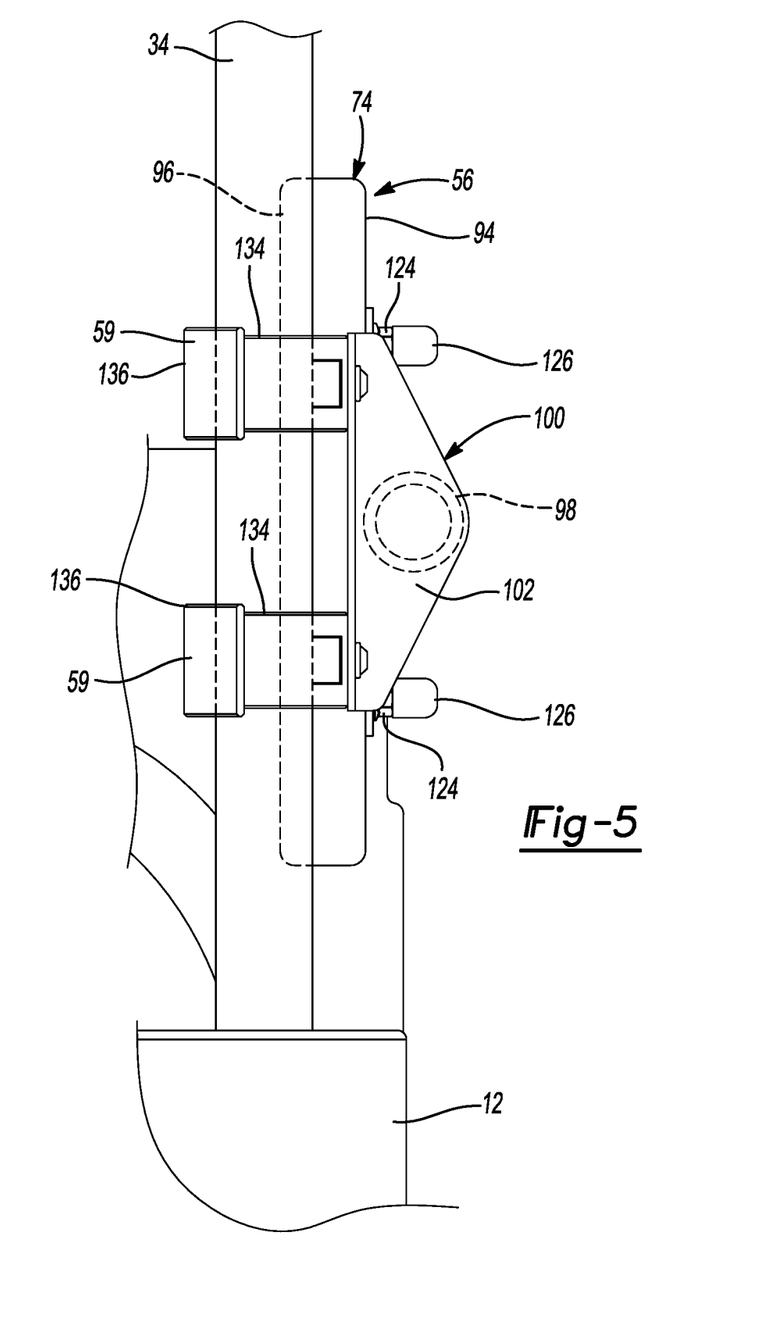
FIG. 5 is a rear view of the seat back assembly.

As shown in FIG. 2, the seat bottom 54 may be a generally rectangular-shape and includes a foam pad 62 and a cover 64. The foam pad 62 is disposed within the cover 64 and provides cushion for occupants sitting on the seat bottom 54. The cover 64 may be shaped as a bag and includes a first surface 66 and a second surface 68. The first surface 66 faces the top wall 60*a* of the respective rear wheel well 38 and may be made of a puncture resistant material. The first surface 66 is coupled to the top wall 60*a* via hook-and-loop fasteners. For example, a plurality of first strips 70 (e.g., hook strips) of the fasteners are attached to one of the first surface 66 and the top wall 60*a* of the respective rear wheel well 38 and are configured to attach to second strips 72 (e.g., loop strips) of the fasteners that are attached to the other of the first surface 66 and the top wall 60*a* of the respective rear wheel well 38, thereby coupling the seat bottom 54 to the respective rear wheel well 38.

The second surface 68 opposes the first surface 66 and is made of a durable and flexible material (e.g., leathery material). It should be understood that the seat bottom 54 may be attached to the top wall 60*a* of the respective rear wheel well 38 via mechanical fasteners or any other suitable method of attachment in addition to, or alternatively to, the fasteners.

As shown in FIG. 1, the seat back assembly 56 is spaced apart from the seat bottom 54 and is configured to be removably coupled to the posts 28, 34 of the first and second hoop members 20, 22, respectively. The seat back assembly 56 includes a seat back 74, a longitudinally extending beam 76 and a plurality of saddles 78. The seat back 74 is longitudinally oriented and extends parallel to the fore/aft direction D of the vehicle 10 travel such that occupants of the seat 16 sit transversely to the forward direction of the vehicle 10 travel. The seat back 74 is also at least partially positioned outboard of the posts 28, 34 of the first and second hoop members 20, 22, respectively, such that a depth d of the seat bottom 54 is maximized without moving the rear wheel well 38 inboard. The seat back 74 is also disposed between the posts 28, 34 of the first and second hoop members 20, 22, respectively.

The seat back 74 may be a generally rectangular-shape and includes a foam pad 80, a plate 82 and a cover 84. The foam pad 80 is coupled to a first surface (not shown) of the plate 82 via an adhesive or any other suitable attachment method (e.g., mechanical fasteners). The foam pad 80 and the plate 82 are disposed within the cover 84. The plate 82 may be made of a metallic material (e.g., steel) and includes sets of openings 86. Each opening 86*a*, 86*b*, 86*c* of a set of openings 86 are vertically aligned with each other. A plurality of threaded studs 88 are attached (e.g., welded) to a second surface 90 of the plate 82 that is opposite the first surface. Each stud 88 extends outwardly from the second surface 90 and is disposed between two of the sets of openings 86.

As shown in FIG. 2, the cover 84 includes a zipper 92 that is operable between an unzipped position to allow for the foam pad 80 and the plate 82 to be disposed therein and a zipped position to retain the foam pad 80 and the plate 82 therein. The cover 84 may be shaped as a bag and includes a first surface 94 and a second surface 96 that is opposite the first surface 94. The first surface 94 faces away from the utility area 18 and may be made of a puncture resistant material. The first surface 94 includes openings 97 that corresponding studs 88 attached to the plate 82 extend through. The second surface 96 faces toward the utility area 18 and is made of a durable, puncture resistant and flexible material (e.g., leather or simulated leather material).

The longitudinally extending beam 76 is configured to be removably coupled to the posts 28, 34 of the first and second hoop members 20, 22, respectively. The longitudinally extending beam 76 is also positioned outboard of the posts 28, 34 of the first and second hoop members 20, 22, respectively, and may be positioned at least partially outboard of the vehicle body 12. The beam 76 may be made of a metallic material (e.g., steel) and includes a tube 98 and angle brackets 100. The tube 98 extends in the longitudinal direction of the vehicle 10 and is configured to be coupled to the seat back 74 via the saddles 78. The brackets 100 are fixed (e.g., welded) at opposing ends of the tube 98 and are configured to be coupled to respective clamps 58, 59 that are, in turn, coupled to the posts 28, 34, respectively.

Each bracket 100 includes a tube-attachment portion or flange 102 and a clamp-attachment portion or flange 104. The tube-attachment portion 102 has a generally triangular-shape and is fixed (e.g., welded) to a respective end of the tube 98. The clamp-attachment portion 104 extends perpendicular to the tube-attachment portion 102 and has a generally rectangular-shape. The clamp-attachment portion 104 includes a plurality of openings 106 formed therein. Fasteners 108 (e.g., screws, bolts, etc.) extend through respective openings 106 of the clamp-attachment portion 104, thereby coupling the bracket 100 and the respective clamps 58, 59 to each other. The openings 106 are elongated to account for tolerances of the post 28, 34 positions.

The saddles 78 couple the beam 76 and the seat back 74 to each other. Each saddle 78 is made of a metallic material (e.g., steel) and includes an arcuate portion 110 and flanges 112. The arcuate portion 110 defines a space 114 that receives the tube 98 of the beam 76 such that the arcuate portion 110 is in engagement with the tube 98. Peripheries 116 of the arcuate portion 110 are attached (e.g., welded) to an outer diametrical surface 118 of the tube 98, thereby fixing the saddle 78 and the tube 98 to each other.

The flanges 112 are planar and extend vertically from opposing ends 120 of the arcuate portion 110. Each flange 112 includes openings 122 formed at corners thereof that corresponding studs 88 welded to the plate 82 extend through. Threaded nuts 124 are threadably engaged with the corresponding studs 88, thereby coupling the beam 76 and the seat back 74 to each other and causing the flange 112 to abut against the first surface 94 of the cover 84. Threaded protection caps 126 may be attached to the studs 88 to shield an occupant from the stud threads. It is understood that any other suitable mechanical fasteners may be utilized to fix the beam 76 and the seat back 74 to each other.

The clamps 58 interconnect one bracket 100 of the beam 76 to the post 28. The clamps 58 shown in the figures are toggle clamps. In some configurations, the clamps 58 may be spring clamps, U-bolt clamps, band clamps or any other suitable clamps. For example, the U-bolt clamps or brackets may be fixed to the post 34 such that the clamps are not removable or movable along the post 34. Each clamp 58 includes a clamp body 128 and a clamp lever 130. The clamp body 128 of each clamp 58 is disposed around the post 28. The clamp lever 130 is connected to the clamp body 128 and is operable between a first position in which the clamp body 128 is movable along the post 28 and a second position in which the clamp body 128 is prevented from moving along the post 28. Stated differently, when the clamp lever 130 is in the second position, a force is applied to the clamp body 128 which causes the clamp body 128 to grip the post 28 and prevent movement of the clamp body 128 along the post 28. When the clamp lever 130 is in the second position, the fasteners 108 extend through the one bracket 100 of the beam 76 and the clamps 58, thereby coupling the one bracket 100 and the clamps 58 to each other.

The clamps 59 interconnect the other bracket 100 of the beam 76 to the post 34. The clamps 59 shown in the figures are toggle clamps. In some configurations, the clamps 59 may be spring clamps, U-bolt clamps, band clamps or any other suitable clamps. For example, the U-bolt clamps or brackets may be fixed to the post 34 such that the clamps are not removable or movable along the post 34. Each clamp 59 includes a clamp body 134 and a clamp lever 136. The clamp body 134 of each clamp 59 is disposed around the post 34. The clamp lever 136 is connected to the clamp body 134 and is operable between a first position in which the clamp body 134 is movable along the post 34 and a second position in which the clamp body 134 is prevented from moving along the post 34. Stated differently, when the clamp lever 136 is in the second position a force is applied to the clamp body 134 which causes the clamp body 134 to grip the post 34 and prevent movement of the clamp body 134 along the post 34. When the clamp lever 136 is in the second position, the fasteners 108 extend through the other bracket 100 of the beam 76 and the clamps 59, thereby coupling the other bracket 100 and the clamps 59 to each other.

It is also understood that one or more seat belt assemblies 140 are coupled to the vehicle body 12 and associated with a respective vehicle seat 16. In some configurations, a transversely extending seat assembly (not shown) may be removably coupled to the vehicle floor 36 in the utility area 18 and may seat occupants thereon.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A removable vehicle seat for a vehicle including first and second spaced apart posts, the seat comprising:
    a seat bottom adapted to be removably coupled to the vehicle;
    a seat back assembly spaced apart from the seat bottom, the seat back assembly adapted to be removably coupled to the first and second posts of the vehicle, the seat back assembly including:
        a seat back longitudinally oriented and extending parallel to a forward direction of vehicle travel such that an occupant of the removable seat sits transversely to the forward direction of vehicle travel,
        a longitudinally extending beam adapted to interconnect the first and second posts, the beam including a tube, a first bracket and a second bracket, the first bracket being fixed to a first end of the tube and the second bracket being fixed to a second opposite end of the tube,
        saddles fixing the tube to the seat back, the saddles being in engagement with and fixed to the tube, the saddles including a flange fastened to the seat back,
    a first clamp adapted to interconnect the first bracket to one of the first and second posts; and
    a second clamp adapted to interconnect the second bracket to the other of the first and second posts.

2. The seat of claim 1, wherein the seat back includes a cover, a plate and a foam pad attached to the plate, the plate and the foam pad disposed within the cover.

3. The seat of claim 1, wherein the saddles each include a curved portion positioned in engagement with an outer surface of the tube.

4. The seat of claim 1, wherein one of the brackets includes a first flange fixed to the tube and a second flange fixed to the first clamp, the first and second flanges extending perpendicularly to one another.

5. The seat of claim 1, wherein the seat back assembly includes threaded fasteners welded to the seat back and extending through apertures in the saddles.

6. The seat of claim 1, wherein the first clamp includes a first clamp body and a first lever coupled to the first clamp body, the first lever operable between a first position in which the first clamp body is movable along the one of the first and second posts and a second position in which the first clamp body is prevented from moving along the one of the first and second posts.

7. The seat of claim 6, wherein the second clamp includes a second clamp body and a second lever coupled to the second clamp body, the second lever operable between a first position in which the second clamp body is movable along the other of the first and second posts and a second position in which the second clamp body is prevented from moving along the other of the first and second posts.

8. A vehicle comprising:
    a vehicle body having a utility area;
    a roll over protection system (ROPS) having first and second spaced apart posts disposed in the utility area and coupled to the vehicle body; and a removable vehicle seat including:
a seat bottom removably coupled to the vehicle body,
a seat back assembly spaced apart from the seat bottom, the seat back assembly removably coupled to the first and second posts of the roll over protection system, the seat back assembly including:
   a seat back longitudinally oriented and extending parallel to a forward direction of vehicle travel,
   a longitudinally extending beam interconnecting the first and second posts, the beam including a tube, a first bracket and a second bracket, the first bracket being fixed to a first end of the tube and the second bracket being fixed to a second opposite end of the tube,
      a saddle fixing the tube to the seat back, the saddle being in engagement with and fixed to the tube, the saddle including a flange fastened to the seat back,
   a first clamp interconnecting the first bracket to one of the first and second posts; and
   a second clamp interconnecting the second bracket to the other of the first and second posts.

9. The vehicle of claim 8, wherein the beam is positioned at least partially outboard of the first and second posts.

10. The vehicle of claim 8, wherein the seat bottom is coupled to a wall defining a rear wheel well via hook and loop fasteners.

11. The seat of claim 8, wherein the seat back includes a cover, a plate and a foam pad attached to the plate, the plate and the foam pad disposed within the cover.

12. The seat of claim 8, wherein the saddles each include a curved portion positioned in engagement with an outer surface of the tube.

13. The seat of claim 8, wherein one of the brackets includes a first flange fixed to the tube and a second flange fixed to the first clamp, the first and second flanges extending perpendicularly to one another.

14. The seat of claim 8, wherein the seat back assembly includes threaded fasteners welded to the seat back and extending through apertures in the saddles.

15. The seat of claim 8, wherein the first clamp includes a first clamp body and a first lever coupled to the first clamp body, the first lever operable between a first position in which the first clamp body is movable along the one of the first and second posts and a second position in which the first clamp body is prevented from moving along the one of the first and second posts.

16. The seat of claim 15, wherein the second clamp includes a second clamp body and a second lever coupled to the second clamp body, the second lever operable between a first position in which the second clamp body is movable along the other of the first and second posts and a second position in which the second clamp body is prevented from moving along the other of the first and second posts.

17. The seat of claim 8, further comprising another removable vehicle seat positioned within the utility area, the another removable vehicle seat faces the removable vehicle seat and is symmetric to the removable vehicle seat about a center of the utility area.

* * * * *